United States Patent [19]

Molliere et al.

[11] Patent Number: 5,787,020

[45] Date of Patent: Jul. 28, 1998

[54] PROCEDURE AND APPARATUS FOR ANALYZING ELEVATOR OPERATION

[75] Inventors: Etienne Molliere, Nice; Veikko Mattsson; Risto Jokinen, both of Hyvinkää; Jari Lammassaari, Helsinki, all of Finland

[73] Assignee: Kone Oy, Helsinki, Finland

[21] Appl. No.: 764,074

[22] Filed: Dec. 6, 1996

[30] Foreign Application Priority Data

Dec. 8, 1995 [FI] Finland ................... 955921

[51] Int. Cl.⁶ ........................................ G01B 17/00
[52] U.S. Cl. ............... 364/550; 364/550; 364/551.01; 187/393
[58] Field of Search ............... 364/550, 551.01; 187/390, 391–394, 247

[56] References Cited

U.S. PATENT DOCUMENTS 4,512,442  4/1985  Moore et al. .
4,698,780  10/1987 Mandel et al. .
5,027,299  6/1991  Uetani ................................. 364/580
5,306,878  4/1994  Kubo .................................. 187/127
5,557,546  9/1996  Fukai et al. ..................... 364/551.01
5,637,841  6/1997  Dugan et al. ......................... 187/294

Primary Examiner—James P. Trammell

[57] ABSTRACT

The invention relates to a procedure and an apparatus for analyzing elevator functions and detecting deviating functions. By monitoring signals associated with traffic events in the elevator system, an analyzer connected to the elevator learns the normal operation of each elevator independently. Signals occurring during operation are compared with the information thus acquired and a failure alarm is produced or the information is altered to make it accord with the new, changed situation.

13 Claims, 3 Drawing Sheets

PROCEDURE AND APPARATUS FOR ANALYZING ELEVATOR OPERATION

The present invention relates to a procedure and an apparatus for monitoring and stabilizing the operation of an elevator, in which procedure the elevator control system is taught the properties and special features of the elevator.

The operation of an elevator is controlled and regulated by means of numerous control signals, which are sent by the elevator control system to the regulating units in the form of commands or reference values. The messages sent by different regulating units are transmitted to the elevator control system, to be processed and transmitted further to other regulating units to produce required actions. Malfunction of a unit and, in some cases, correct performance of an action causes a signal to be transmitted to the elevator control system. The information carried by the signals is used to control the regulating units, to produce error messages and to collect data for statistics. Examples of such malfunctions are power failures, failure to close the elevator door, cases where an elevator stops between floors, an elevator remains immovable despite control commands, the door cannot be opened, or the lock contact of the door cannot be closed.

Within the elevator system, data transmission generally takes place via the internal cable network of the elevator. An elevator may be connected to an external unit, such as a local or central monitoring room, via separate data transmission cables or via a public data transmission network.

To monitor an elevator and collect statistical information about events, the elevator control signals and the signals indicating the status of regulating units are continuously monitored and any changes in the signals are registered. Due to the individual properties of different elevators, the monitoring device must be adjusted separately in this respect. Variety also results from the point of connection at which a signal is measured. Some malfunctions or events have to be inferred from the combination of other signals or from the chronological order of the signals. The differences between correct and incorrect operation may be very small and are not necessarily discovered by externally observing the operation of the equipment. Moreover, with time, gradual changes take place in the values of certain parameters, necessitating readjustment in connection with maintenance. In consequence, incorrect failure messages are generated, causing unnecessary visits by maintenance personnel, or distorted information appears in the event statistics. In the worst case, the defect is overlooked altogether.

SUMMARY OF THE INVENTION

To solve the problems described above, the object of the present invention is to achieve a new procedure and a new apparatus for monitoring the operation of an elevator.

According to an embodiment of the method of the invention, normal ranges of signal timing are determined automatically, so that deviations from the normal timing range lead to an error message. According to another embodiment, the method involves monitoring the events caused by normal operation and, as a result of the monitoring, automatically changing the definitions of signals belonging to normal operation.

According to yet another alternative, for each elevator, the timing of at least one signal with respect to the instant of occurrence of the malfunction is monitored and, based on this timing, a normal timing range is defined, so that any deviation from the normal timing will produce an error message.

Preferably the signals initially belonging to normal operation are defined automatically in connection with the start-up of the elevator.

Further, according to an additional feature of the method of the invention, events deviating from normal operation are monitored and when the number of deviations reaches a specified limit, a message indicating need for a maintenance is issued. According to another additional feature of the method, events deviating from normal operation are monitored and when the number of deviations reaches a limit determined on the basis of the relation between incorrect and normal functions, a message indicating a need for maintenance is issued.

According to a preferred embodiment, the apparatus of the present invention comprises memory devices in which the definitions of signals regarded as belonging to normal operation can be stored, and in which the information stored in the memory devices can be changed.

According to another preferred embodiment, the apparatus comprises means for comparing a signal to a signal considered normal, as well as means for transmitting an error message when the signal deviates from the normal range, and means for counting the number of events deviating from normal operation and means for transmitting a message indicating a need for maintenance when the number of deviating events reaches a given limit.

An analyzer applying the invention learns the normal operation of each elevator independently, creating a model of normal elevator operation. Data learned and stored by the analyzer is compared with data collected during the use of the elevator, and a deviation leads either to an adjustment of the data to make it accord with the new situation or to issuance of a failure alarm. The status information given by the analyzer is utilized to establish whether the elevator is in good working order or to find out the cause of incorrect operation or a failure event.

The solution offered by the invention makes it possible to achieve a reliable distinction between failure events and events belonging to normal operation of an elevator. Further, an alarm signal can be sent reliably and quickly to a service center or to responsible maintenance personnel. False alarms due e.g. to mischief can be excluded without causing any interruption of elevator operation or unnecessary visits by maintenance personnel. With the analyzer applying the invention, the monitoring is automatically adjusted to match the particular elevator. Thus, the outfit level or the mode of operation of the elevators will not affect the monitoring of failure events or the correctness of the event statistics.

Because of its self-learning nature, the invention can be applied to different elevator systems, from individual elevators to elevator groups comprising several elevators. The invention is also applicable when elevators are being modernized or when new properties are added to old elevators.

BRIEF DESCRIPTION OF THE DRAWINGS

In the following, the invention is described in detail by referring to the drawings, in which.

DETAILED DESCRIPTION OF THE PREFERRED EMBODIMENTS

Figure 1:
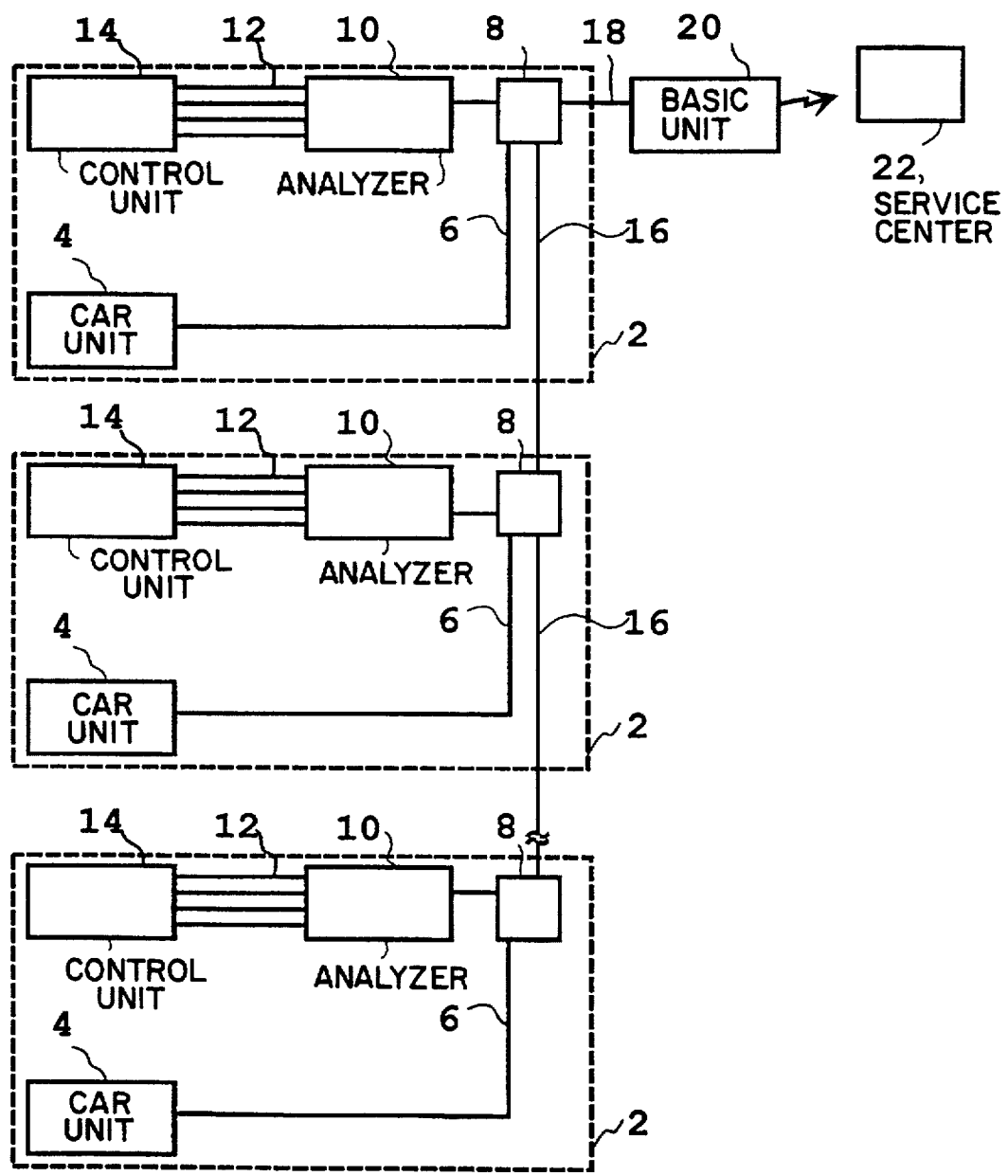
FIG. 1 presents a general diagram of the elevator monitoring system.

FIG. 1 represents an apparatus for monitoring elevator operation and transmitting alarm and failure messages, the apparatus being installed in connection with the elevators 2 in an elevator group comprising N elevators. Only those parts of the elevator equipment that are needed to illustrate the present invention are depicted in the figure. Each elevator 2 is provided with a car unit 4 installed in the elevator car and connected via a two-wire car cable 6 to a car interface unit 8 placed in the machine room of the elevator in question. The car interface units 8 are connected via a four-wire cable 9 to an analyzer 10 for the particular elevator. The analyzer is mounted in the control panel and connected via an interface 12 to the control unit 14. The car interface units 8 adapt the two-wire system of the car cable to the four-wire system used in the machine room. Via the car interface units 8, it is possible to interconnect eight separate elevators to form a group, which is connected via a four-wire cable 18 to a basic unit 20. The elevators belonging to the same basic unit do not necessarily form an elevator group in the sense understood in elevator group control, although it is also possible to connect only elevators of the same elevator group to a given basic unit. The basic unit 20 further has a data communication connection to a service center 22 or to maintenance personnel.

Figure 2:
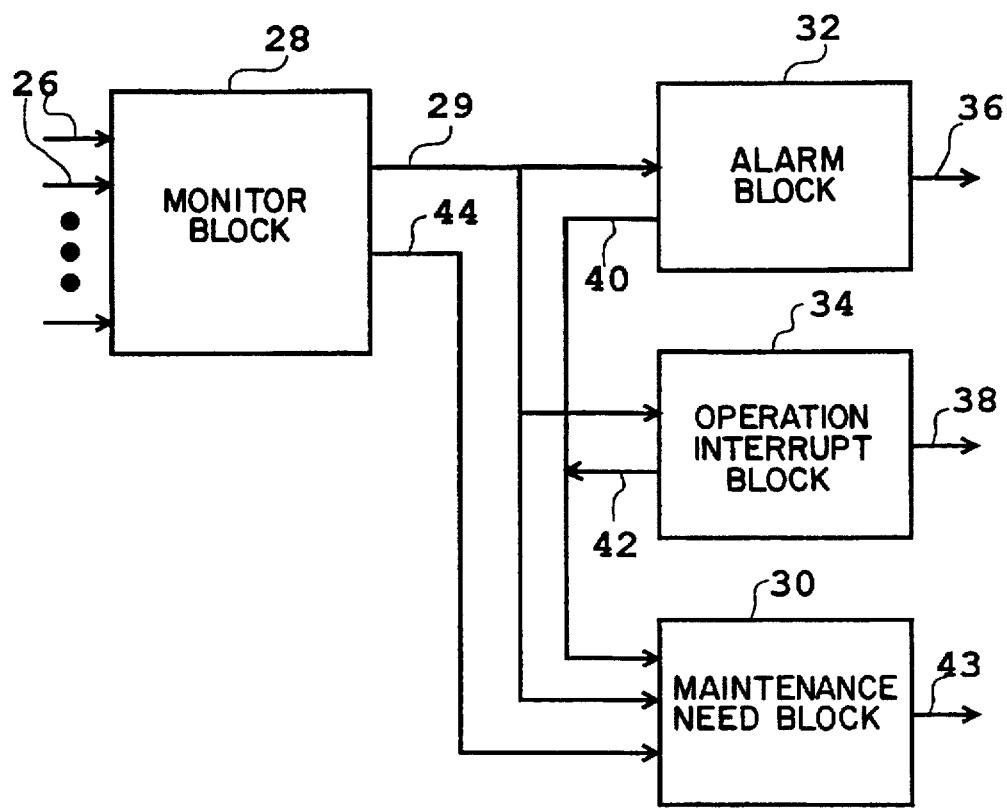
FIG. 2 presents a block diagram of an analyzer.

The analyzer 10 processes the signals sent by the car unit 4 and control unit 14 and other equipment in the elevator system and generates messages from them in a way described in the following, referring to FIG. 2. The analyzer infers from the signals whether the events in elevator operation are normal, in which case they are only recorded in statistics, or whether they deviate from normal, in which case they are registered, or whether they are of a nature requiring an alarm call, in which case the service center is alarmed immediately.

The signals received at the input connectors 26 of the analyzer 10 are passed to a monitor block 28, which infers from the signals whether the situation is normal operation of elevator equipment, which is classified as an elevator event, or incorrect operation of one or more pieces of equipment, which is classified as a failure. The data representing the elevator event is passed to a maintenance need block 30, where data is collected to maintain statistics relating to the number of elevator events, e.g. as per week, month or year. If the operation is regarded as being incorrect, a signal (arrow 29) is sent to the alarm block 32, the operation interrupt block 34 and the maintenance need block 30. The alarm block 32 performs a test on the elevator to see if the alarm is justified and instructs the basic unit 20 via line 36 to carry out an alarm call. If the failure message does not result in an alarm, the alarm block sends the message 40 to the maintenance need block 30. If the failure event causes an interruption of operation, the operation interrupt block 34 sends a failure message or a report 38 on the failure. If the failure event does not cause an interruption of elevator operation, i.e. the fault is of a self-correcting nature, the message 42 is sent to the maintenance need block 30. The maintenance need block 30 collects information about elevator and failure events and gives a maintenance need report at its output 43. Traffic events belonging to normal operation of the elevator are sent via a bus 44 into the maintenance need block 30, which also monitors their number and frequency of occurrence.

The analyzer has several signal inputs, typically 16, and examines the signals received at these inputs. The elevator safety circuit is a system continuously in operation, from which the analyzer normally receives three inputs. Below, the operation of the analyzer is described in greater detail by using door operation as an example and examining the occurrence of signals caused by door operation in different practical situations. Depending on the door type and manufacturer of the door, the safety circuits and the signals supplied by them vary considerably. For this reason, the description is only to be regarded as an example intended to illustrate the operation of the analyzer to achieve operation as provided by the invention. The other analyzer inputs include signals indicating car movement and direction of car movement (CAR MOVING and DIRECTION DOWN), door zone signals and signals indicating a priorized mode of operation. Depending on the application, a varying number of inputs may also be out of use.

For each function to be analyzed, the analyzer must receive signals that enable the operation of the elevator to be registered and operation errors to be detected, regardless of whether they are of a nature requiring interruption of operation or errors that are only recorded as cases of abnormal operation.

Figure 3:
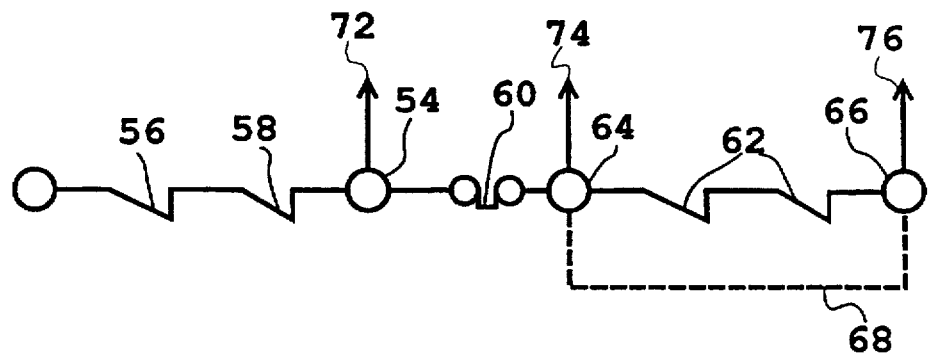
FIG. 3 presents the circuit of a certain door type.

FIG. 3 represents a safety circuit for a fully automatic door. The door safety circuit comprises three different switches, whose status is monitored to determine whether the door is functioning properly. The static part of the safety circuit must be on at all times when the elevator is in operation. The circuit has a test point 54 which provides information as to whether the safety circuit is free of defects. Switches 56 and 58 represent safety circuit switches which have to be on when the elevator is active. Contact 60 represents the door contact of the elevator car, said contact remaining closed until the door is opened. The landing door lock contacts 62 are opened when the elevator reaches the door zone, where opening the door is permitted. From a point 64 between the door contact 60 and the lock contacts 62, a second signal reflecting the operation of the safety circuit, indicating that the doors are opened, is obtained. Point 66 provides a third door safety circuit signal to be supplied to the analyzer, indicating when the lock contact is opened or closed. Moreover, the 'open door' command controlling the door operation is supplied to the analyzer.

Figure 4:
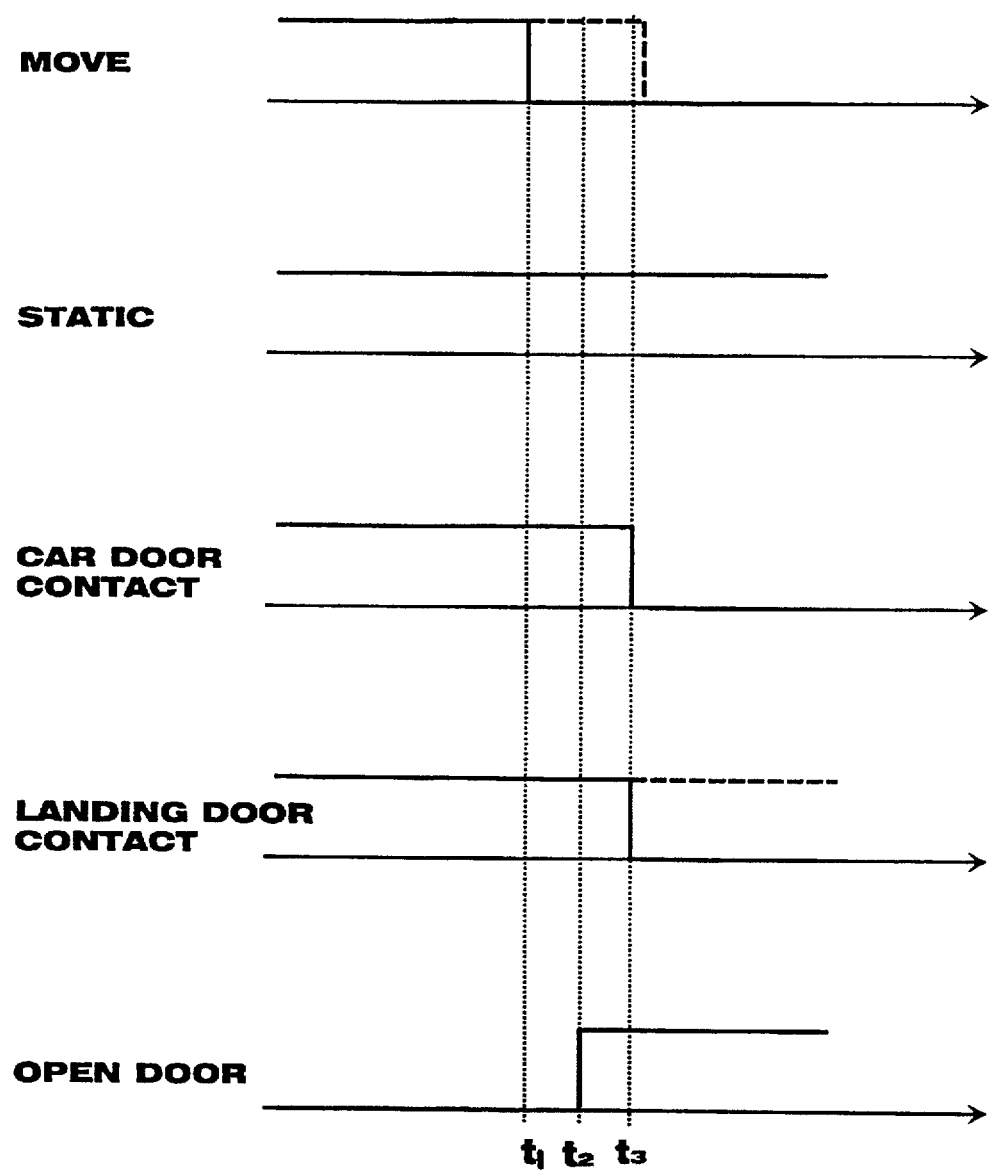
FIG. 4 presents signals obtained from an elevator.

FIG. 4 illustrates the variation of the signals measured from points 54, 64 and 66, represented by arrows 72, 74 and 76 respectively, and the 'open door' command as a function of time when the elevator is arriving at a landing and the doors are opened. Moreover, FIG. 4 also shows a MOVE signal, which represents the movement of the elevator. Before instant t1, all signals except for the OPEN DOOR signal are high. The STATIC (72) signal at point 54 must always be on. At instant t1, the MOVE signal becomes zero, and at instant t2 an 'open door' command is issued, causing the corresponding signal OPEN DOOR to go up high. When the door is opened at instant t3, the signals indicating opening of the door, CAR DOOR CONTACT (74), and the door zone signal LANDING DOOR CONTACT (76) are reset.

FIG. 4 shows the signals of the door safety circuit in FIG. 3 with solid lines in a practical case. However, depending on the implementation, the mutual order of the signals may vary within certain limits. The broken lines represent certain alternative cases. The MOVE signal may remain on longer than the CAR DOOR CONTACT and LANDING DOOR CONTACT signals if the advance door opening function is in use. Similarly, the LANDING DOOR CONTACT signal may remain continuously on if the application uses the advance door opening function, in which case the lock contact circuit is bypassed, as shown a broken line 68 in FIG. 3.

During the teach-in operation of the elevator, the analyzer learns or it is informed about the door combination used in the elevator concerned and possibly on different floors. During normal traffic, by monitoring its safety circuit inputs, the analyzer is able to decide whether the elevator is functioning correctly and to register any failure or alarm situations on the basis of what it has learned before. As the signal measurement points may be different for different elevators, the analyzer also has to be able to correctly interpret signals or signal timing slightly diverging from normal. During the teach-in operation, or alternatively during normal operation, the analyzer judges according to its program which functions are correct. For instance, if a signal does not correspond to its normal value but the elevator is still functioning in accordance with the control, the situation is regarded as belonging to the sphere of normal operation, but if any incorrect functions occur simultaneously with the signal or immediately thereafter, the incorrect signal is registered as well, even if it does not interfere with the normal operation of the elevator.

During the operation of the elevator, the signals are continuously monitored and any changes occurring in the signals are registered as described in connection with FIG. 2. Deviations of signal values from the ideal or theoretic model are allowed, and the analyzer defines the limits of inaccuracy within which the functions are either correct or lead to the registering of a failure or require an alarm. By monitoring the events, the analyzer draws conclusions as to what sort of operation is characteristic of the elevator in question and alters the ideal model accordingly.

Besides monitoring the occurrence and wrong timing of signals, it is important to keep track of the presence of the required signals. Especially during the teach-in operation, the presence of the signals is checked in situations where functions important to passenger safety are concerned. An alarm is immediately sent to installation or maintenance personnel if a required signal is not present even though the device is connected normally and in operation. Similarly, if during normal operation a signal disappears for some reason, a failure message is sent.

When the analyzer has received signals of a nature that, based on the data programmed in it, requires a failure message or an alarm, the analyzer gives the elevator a control command to the effect that the elevator has to perform the function in connection with which the failure occurred. If the elevator responds to the control and performs in a corresponding manner, the failure is only registered and stored in the memory of the analyzer. The number of failure events is monitored on a time basis and the maintenance personnel is informed when the failure frequency increases or when the number of failures exceeds a specified limit. For example, for every 2000 cases of normal operation, five cases of incorrect operation not requiring an alarm can be allowed. If the ratio of correct and incorrect operation exceeds this limit, a notice of maintenance need is issued, or possibly a failure message if the frequency increases considerably.

The invention has been described above by the aid of one of its embodiments. However, the presentation is not to be regarded as constituting a limitation, but the embodiments of the invention can be varied within the limits defined by the following claims.

We claim:

1. A method for analyzing elevator functions and detecting deviating functions, comprising the steps of:

continuously monitoring functions of an elevator by monitoring signals which control elevator components or which appear in response to elevator component functions;

analyzing the monitored functions for deviations from a normal range by comparing successive signals relating to a given function with each other, or by comparing the monitored signals with a reference quantity; and updating the definition of the normal range for the monitored signals, the normal range corresponding to normal operation and being updated based upon frequencies of occurrence of the monitored signals and their deviations, such that the definitions of signals to be regarded as belonging to normal operation are determined automatically for the elevator.

2. The method as defined in claim 1, wherein said monitoring step monitors a timing of the signals, normal timing ranges of the signals' timings being updated automatically for each of at least one elevator, and said method further comprises the step of issuing an error message when said analyzing step finds deviations from the normal timing range.

3. The method as defined in claim 2, wherein said monitoring step monitors events deviating from normal operation and, as a result of the monitoring, said updating step automatically changes the definitions of signals belonging to the normal operation.

4. The method as defined in claim 3, wherein said monitoring step monitors, for each elevator, the timing of at least one signal with respect to the instant of occurrence of a predetermined elevator component function and, based on this monitoring, said updating step defines the normal timing range, any deviation from the normal timing range causing said issuing step to issue an error message.

5. The method as defined in claim 1, wherein the normal range for signals corresponding to normal operation is initialized automatically during start-up of the elevator.

6. A method for analyzing elevator functions and detecting deviating functions, comprising the steps of:

continuously monitoring functions of an elevator by monitoring signals which control elevator components or which appear in response to elevator component functions;

analyzing the monitored functions for deviations by comparing successive signals relating to a given function with each other, or by comparing the monitored signals with a reference quantity; and defining a normal range for the monitored signals, the normal range corresponding to normal operation and being based upon frequencies of occurrence of the monitored signals and their deviations, such that the definitions of signals to be regarded as belonging to normal operation are determined automatically for the elevator, wherein said monitoring step monitors the number of events diverging from normal operation and, when the number of divergences reaches a specified limit, a message indicating a need for maintenance is issued.

7. The method as defined in claim 1, wherein said monitoring step monitors the number of events diverging from normal operation and, when the number of divergences reaches a limit value, which is determined on the basis of the ratio between incorrect functions and normal functions, a message indicating a need for maintenance is issued.

8. An apparatus for analyzing elevator functions and detecting deviating functions, comprising:

monitoring means for continuously monitoring elevator functions by monitoring signals controlling elevator components or appearing in response to elevator functions;

analyzing means for analyzing the monitored elevator functions and detecting deviations from a normal range by comparing successive signals relating to a given function with each other or by comparing the monitored signals with a reference quantity; and updating means for updating the definition of the normal signal ranges based upon the frequencies of occurrence of the monitored signals and their deviations, such that the definitions of signals regarded as belonging to normal operation are determined automatically for the elevator.

9. The apparatus as defined in claim 8, further comprising:

one or more memory devices in which the definitions of the normal signal ranges regarded as belonging to normal operation are stored, wherein the data stored in the memory devices can be changed by said updating means.

10. An apparatus as defined in claim 9, further comprising:

comparison means for comparing a monitored signal to a signal considered normal;

error message issuing means for sending an error message when the compared signal deviates from its normal range;

a counter for counting the number of events deviating from normal operation; and maintenance message issuing means for sending a message indicating a need for maintenance when the number of counted deviating events reaches a given limit.

11. The apparatus as defined in claim 8, wherein said monitoring means monitors timing of at least one signal relative to the instant of occurrence of a predetermined elevator component function and, based on this monitoring, said updating means adjusts a normal timing range.

12. The apparatus as defined in claim 11, further comprising an error message issuing circuit, any deviation from the normal timing range detected by said monitoring means causing an error message to be issued by said error message issuing circuit.

13. The apparatus as defined in claim 8, wherein said monitoring means monitors elevator functions for each of a plurality of elevators, said analyzing means analyzes the monitored signals individually for respective elevators, and said defining means defines normal signal ranges individually for respective elevators.

* * * * *